(12) United States Patent
Guemmer

(10) Patent No.: US 10,378,545 B2
(45) Date of Patent: Aug. 13, 2019

(54) FLUID FLOW MACHINE WITH HIGH PERFORMANCE

(71) Applicant: Rolls-Royce Deutschland Ltd & Co KG, Blankenfelde-Mahlow (DE)

(72) Inventor: Volker Guemmer, Allershausen (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 145 days.

(21) Appl. No.: 15/680,617

(22) Filed: Aug. 18, 2017

(65) Prior Publication Data

US 2018/0058456 A1    Mar. 1, 2018

(30) Foreign Application Priority Data

Aug. 26, 2016   (DE) .................. 10 2016 115 868

(51) Int. Cl.
*F01D 5/14*    (2006.01)
*F04D 19/02*   (2006.01)
(Continued)

(52) U.S. Cl.
CPC ........... *F04D 19/028* (2013.01); *F01D 5/142* (2013.01); *F01D 5/146* (2013.01); *F04D 29/324* (2013.01);
(Continued)

(58) Field of Classification Search
CPC .......... F01D 5/147; F01D 5/143; F01D 5/145; F01D 5/141; F04D 29/544; F04D 29/324
See application file for complete search history.

(56) References Cited

U.S. PATENT DOCUMENTS 2,991,929 A   7/1961  Stalker
3,775,023 A   11/1973 Davis et al.
(Continued)

FOREIGN PATENT DOCUMENTS

DE           897616 C    11/1953
DE     102009033591 A1   1/2011
(Continued)

OTHER PUBLICATIONS

European Search Report dated Jan. 23, 2018 for counterpart European Patent Application No. 17187229.4.
(Continued)

*Primary Examiner* — Justin D Seabe
*Assistant Examiner* — Behnoush Haghighian
(74) *Attorney, Agent, or Firm* — Shuttleworth & Ingersoll, PLC; Timothy J. Klima

(57) ABSTRACT

A fluid flow machine, includes a main flow path formed by a hub and a housing, an arrangement of rotating blades in the main flow path to supply energy to the fluid, forming a rotor assembly group, an arrangement of resting blades arranged adjacent to the rotor in the main flow path, forming a stator assembly group, wherein respectively one rotor assembly group and one stator assembly group adjacent thereto form a stage of the fluid flow machine. In at least one stage, the averaged blade profile angles $\beta_{RI}$, $\beta_{RE}$ of the rotor assembly group, the averaged blade profile angles $\beta_{SI}$, $\beta_{SE}$ of the stator assembly group, as well as the course of the cross-sectional areas of the main flow path in a downstream direction are selected such that they fulfill a certain relationship to increase the realizable level of efficient work to be supplied.

14 Claims, 7 Drawing Sheets

(51) Int. Cl.
*F04D 29/32* (2006.01)
*F04D 29/54* (2006.01)
*B64D 27/16* (2006.01)

(52) U.S. Cl.
CPC ......... *F04D 29/542* (2013.01); *F04D 29/544* (2013.01); *F04D 29/547* (2013.01); *B64D 27/16* (2013.01); *F05D 2250/323* (2013.01); *F05D 2250/324* (2013.01); *F05D 2250/713* (2013.01); *Y02T 50/673* (2013.01)

(56) References Cited

U.S. PATENT DOCUMENTS

| | | | | |
|---|---|---|---|---|
| 4,431,376 A | * | 2/1984 | Lubenstein | F01D 5/141 416/223 A |
| 5,779,443 A | * | 7/1998 | Haller | F01D 5/141 415/191 |
| 6,129,528 A | * | 10/2000 | Bradbury | F04D 29/384 416/223 R |
| 6,709,239 B2 | * | 3/2004 | Chandraker | F01D 5/141 416/238 |
| 6,899,526 B2 | * | 5/2005 | Doloresco | F01D 5/141 416/223 A |
| 7,011,495 B2 | * | 3/2006 | Guemmer | F01D 5/142 415/199.5 |
| 7,175,393 B2 | * | 2/2007 | Chandraker | F01D 5/141 416/223 A |
| 7,416,382 B2 | * | 8/2008 | Guemmer | F01D 5/141 415/160 |
| 7,419,353 B2 | * | 9/2008 | Guemmer | F01D 5/141 415/191 |
| 7,559,741 B2 | | 7/2009 | Reichert et al. | |
| 7,967,571 B2 | * | 6/2011 | Wood | F01D 5/141 416/243 |
| 8,152,473 B2 | * | 4/2012 | Clemen | F01D 5/141 416/241 R |
| 8,157,518 B2 | * | 4/2012 | Decker | F04D 29/384 415/211.2 |
| 8,167,548 B2 | * | 5/2012 | Greim | F01D 5/141 415/193 |
| 8,235,658 B2 | | 8/2012 | Guemmer | |
| 8,337,154 B2 | * | 12/2012 | Decker | F04D 25/0606 415/191 |
| 8,439,646 B2 | * | 5/2013 | Guemmer | F01D 5/20 415/219.1 |
| 8,523,531 B2 | * | 9/2013 | Micheli | F01D 5/141 416/223 A |
| 8,562,288 B2 | * | 10/2013 | Guemmer | F04D 29/542 415/148 |
| 8,684,698 B2 | * | 4/2014 | Breeze-Stringfellow | F01D 5/141 416/223 A |
| 8,708,660 B2 | * | 4/2014 | Micheli | F01D 5/141 416/238 |
| 8,747,072 B2 | * | 6/2014 | Micheli | F01D 5/141 416/238 |
| 8,784,042 B2 | * | 7/2014 | Clemen | F01D 5/141 415/144 |
| 8,864,457 B2 | * | 10/2014 | Malandra | F01D 5/141 415/191 |
| 9,291,059 B2 | * | 3/2016 | Micheli | F01D 5/141 |
| 9,458,720 B2 | * | 10/2016 | Cellier | F01D 5/143 |
| 9,464,526 B2 | * | 10/2016 | Cellier | F01D 5/143 |
| 9,797,267 B2 | * | 10/2017 | Lohaus | F01D 5/141 |
| 2006/0165520 A1 | * | 7/2006 | Guemmer | F01D 5/141 415/191 |
| 2007/0140837 A1 | * | 6/2007 | Guemmer | F01D 5/141 415/160 |
| 2009/0257866 A1 | * | 10/2009 | Greim | F01D 5/141 415/208.1 |

FOREIGN PATENT DOCUMENTS

| | | |
|---|---|---|
| DE | 102010027588 A1 | 1/2012 |
| DE | 102014206217 A1 | 10/2015 |
| EP | 0953728 A1 | 11/1999 |
| EP | 2096260 A2 | 9/2009 |
| GB | 505078 A | 5/1939 |
| WO | WO2005071229 A1 | 8/2005 |

OTHER PUBLICATIONS

German Search Report dated Jul. 18, 2017 for counterpart German Application No. DE 10 2016 115 868.2.

* cited by examiner

FLUID FLOW MACHINE WITH HIGH PERFORMANCE

REFERENCE TO RELATED APPLICATION

This application claims priority to German Patent Application DE102016115868.2 filed Aug. 26, 2016, the entirety of which is incorporated by reference herein.

BACKGROUND

The invention relates to a fluid flow machine.

The aerodynamic loads applied to fluid flow machines, such as for example fans, compressors, pumps and blowers that can be operated with a gaseous as well as with a liquid medium, is determined by the growth and separation of boundary layers on the blades as well as on the hub and housing walls. Usually, a good operational behavior can be obtained when the aerodynamic loading is evenly distributed to the rotor blading and the stator blading, for example in a fan stage or compressor stage. What mostly occurs here is a decrease of the flow path's cross-sectional area in flow direction, which is necessary with a compressible working medium between the entry and the exit plane of a stage, similar at the rotor and the stator.

The stability limit of fluid flow machines such as fans, compressors, pumps and blowers is significantly determined by the choice of the profile angle of the blading and the resulting loading and utilisation factor (performance). For this reason, threshold values that are based on the designing experience of successful machines are usually not exceeded. This applies in the same way and according to the state of the art also to a similar degree to the rotor blade rows as well as stator blade rows of a fluid flow machine. The correspondingly used threshold values for rotors and stators according to the state of the art entail a course of the main flow path (formed by the hub and housing contour of the machine) that extends in a smooth and continuous manner and barely shows any differences to the downstream flow cross-section changes in rotors and stators. Thus, at a given rotor blade speed, the possible stage pressure conditions are limited to values that have already been long known.

DE 10 2009 033 591 A1 describes a fluid flow machine with at least one blade row group in which the area cross section of the main flow path in at least one stage of the fluid flow machine leads to an excessive rotor-stator necking ratio.

There is a need to provide a fluid flow machine that implements a new manner of relating the blade angle and the course of the main flow path area to each other.

SUMMARY

Accordingly to an embodiment of the invention it is provided a combination of a special downstream course of the area cross sections of the main flow path that are passed by the flow and a special dimensioning of the entry and exit angle of the rotor blade profiles and stator blade profiles of a stage of the fluid flow machine (FFM).

In this manner, it is provided that, in at least one stage, the averaged blade profile angles $\beta RI$, $\beta RE$ of the rotor assembly group, the averaged blade profile angles $\beta SI$, $\beta SE$ of the stator assembly group, as well as the course of the cross-sectional areas of the main flow path in the downstream direction are chosen so as to fulfil the following relationship:

$$ACC/RSC > -7.2143 LC^2 + 1.5414 LC + 2.776,$$

wherein ACC identifies the area change count of a stage and is defined based on the following formula:

$$ACC = [(R2^2 - R1^2)/(R4^2 - R3^2)]/[(R6^2 - R5^2)/(R8^2 - R7^2)]$$

At that, in the through-flow direction of the fluid flow machine, it applies that $R_1$ is the radius at the radially innermost point of the leading edge of that blade row of the rotor assembly group that is located furthest upstream, $R_2$ is the radius at the radially outermost point of the leading edge of that blade row of the rotor assembly group that is located furthest upstream, $R_3$ is the radius at the radially innermost point of the trailing edge of that blade row of the rotor assembly group that is located furthest downstream, $R_4$ the radius at the radially outermost point of the trailing edge of that blade row of the rotor assembly group that is located furthest downstream, $R_5$ is the radius at the radially innermost point of the leading edge of that blade row of the stator assembly group that is located furthest upstream, $R_6$ is the radius at the radially outermost point of the leading edge of that blade row of the stator assembly group that is located furthest upstream, $R_7$ is the radius at the radially innermost point of the trailing edge of that blade row of the stator assembly group that is located furthest downstream, $R_8$ is the radius at the radially outermost point of the trailing edge of that blade row of the stator assembly group that is located furthest downstream, Thus, the area change count ACC indicates the rotor-stator necking ratio, i.e. the ratio of the change in cross-section of the rotor and the stator within a stage, and thus the course of the cross-sectional areas of the main flow path in the downstream direction.

Further, RSC indicates the rotor stagger count of a stage and is defined based on the following formula:

$$RSC = 1/(\tan \alpha_{RI} + \tan \alpha_{IE}).$$

The rotor stagger count RSC of a stage is a measure for the flow rate that the stage has in relation to the rotational speed of the rotor assembly group.

Further, LC indicates the load count of a stage and is defined based on the following formula:

$$LC = [1/(\tan \alpha_{RE} + \tan \alpha_{SI})*(\tan \alpha_{SI})] - [1/(\tan \alpha_{RI} + \tan \alpha_{IE})*(\tan \alpha_{IE})].$$

The load count LC of a stage is a measure for the work performed by the stage or for the flow deflection at the rotor assembly group and the stator assembly group. Here, a high value of LC indicates a high degree of deflection.

At that, $\square IE$ is the averaged angle value of the inflow swirl in front of the rotor assembly group, $\alpha_{RI}$ is the effective rotor entry angle and is defined as: $\alpha_{RI} = \beta_{RI} - [2/180*\pi]$, $\alpha_{RE}$ is the effective rotor exit angle and is defined as: $\alpha_{RE} = \beta_{RE} + [2/180*\pi]$, $\alpha_{SI}$ is the effective stator entry angle and is defined as: $\alpha_{SI} = \beta_{SI} - [2/180*\pi]$, $\alpha_{SE}$ is the effective stator exit angle and is defined as: $\alpha_{SE} = \beta_{SE} + [2/180*\pi]$.

Further, $\beta_{RI}$ is the averaged entry blade profile angle of the rotor assembly group, $\beta_{RE}$ is the averaged exit blade profile angle of the rotor assembly group, $\beta_{SI}$ is the averaged entry blade profile angle of the stator assembly group, and $\beta_{SE}$ is the averaged exit blade profile angle of the stator assembly group, wherein the averaging is performed respectively across the blade height.

The angle−$[2/180*\square]$ is an incidence angle and the angle+$[2/180*\square]$ is a deviation angle. With these angles, it is taken into account that the flow is flowing to the blades or away from them at a smaller angle with respect to the entry blade profile angle and the exit blade profile angle, which is assumed to be $2\square/180*$ at approximately ±2 degrees.

The invention is based on the insight that the realizable level of the efficiently supplied work can be increased if the rotor and stator blade profile angles as well as the main gas path course are put into a new relation to each other, as a consequence of which the number of the stages of multi-stage axial fluid flow machines can be reduced, while the pressure conditions as they are required today can be met.

In embodiments of the fluid flow machines according to the invention it is provided that the blades of the rotor assembly group are embodied with a strong profile curvature and that the stator assembly group is embodied as a high-lift configuration.

The invention relates to a fluid flow machine for a gaseous as well as a liquid working medium. The teaching according to the invention presupposes a design of the fluid flow machine that is at least substantially axial.

It is provided in one embodiment of the invention that the averaged entry blade profile angle $\beta_{RI}$ of the rotor assembly group, the averaged exit blade profile angle $\beta_{RE}$ of the rotor assembly group, the averaged entry blade profile angle $\beta_{SI}$ of the stator assembly group, and the averaged exit blade profile angle $\beta_{SE}$ of the stator assembly group are determined as follows:

$$\beta_{RI} = [\Sigma_{i=1 \ldots 21} \beta_{RIN}(i)]/21$$

$$\beta_{RE} = [\Sigma_{i=1 \ldots 21} \beta_{REX}(i)]/21$$

$$\beta_{SI} = [\Sigma_{i=1 \ldots 21} \beta_{SIN}(i)]/21$$

$$\beta_{SE} = [\Sigma_{i=1 \ldots 21} \beta_{SEX}(i)]/21$$

At that, $\beta_{RIN}(i)$ indicates the entry blade profile angle of the rotor assembly group in the meridian streamline profile section (i), $\beta_{REX}(i)$ the exit blade profile angle of the rotor assembly group in the meridian streamline profile section (i), $\beta_{SIN}(i)$ the entry blade profile angle of the stator assembly group in the meridian streamline profile section (i), and $\beta_{SEX}(i)$ indicates the exit blade profile angle of the stator assembly group in the meridian streamline profile section (i). Here, the meridian streamline profile sections (i) are distributed in an equidistant manner between the hub and housing.

Thus, the averaged entry blade profile angle or exit blade profile angle of the blades of a rotor assembly group or stator assembly group is a mean value across a high number of the respective blade profile angle of meridian streamline profile sections that are distributed in an equidistant manner along the main flow path height between the hub and housing contour, wherein 21 is chosen as a number by way of example.

According to an embodiment of the invention, the above-mentioned averaged angle value $\alpha_{IE}$ of the inflow swirl in front of the rotor assembly group equals zero if a stage (consisting of a rotor assembly group and the stator assembly group that is arranged directly downstream of the rotor assembly group) has no inlet guide stator assembly group and a swirl-free inflow to the rotor assembly group is provided. The value does not equal zero if a swirling inflow is provided due to other built-in components.

For the case that, as it is provided according to one embodiment variant of the present invention, the fluid flow machine has an inlet guide stator assembly group arranged upstream with respect to a regarded stage, the averaged angle value $\alpha_{IE}$ of the inflow swirl in front of the rotor assembly group is determined by the effective inlet guide stator exit angle of the inlet guide stator assembly group, wherein one then has:

$\alpha_{IE} = \beta_{IE} + [2/180*\pi]$, if the inlet guide stator assembly group effects a deflection of the flow towards the machine axis direction, $\alpha_{IE} = \beta_{IE} - [2/180*\pi]$, if the inlet guide stator assembly group effects a deflection of the flow away from the machine axis direction, wherein $\beta_{IE}$ indicates the averaged exit blade profile angle of the inlet guide stator assembly group. It is for example obtained by $[\Sigma_{i=1 \ldots 21} \beta_{IEX}(i)]/21$, wherein $\beta_{IEX}$ indicates the exit blade profile angle of the inlet guide stator assembly group in the meridian streamline profile section (i).

A further embodiment of the invention provides that the stator assembly group of at least one stage is formed by a high-lift configuration. The latter provides a high lift at the stator. It for example comprises an arrangement with two or more stator blade rows, for example a tandem arrangement of two stator blade rows.

According to a further embodiment, at least one of the stages of the fluid flow machine is provided with a course of the main flow path in which a stronger area change across the rotor assembly group as well as an area change across the stator assembly group that is smaller by comparison is realized. In this case, the area change count ACC is larger than 1.

Further, it can be provided that at least one of the arrangements of the rotor assembly group and the stator assembly group is formed by a blade row group, wherein the at least one blade row group consists of multiple rotor blade rows that are arranged adjacent to it in the main flow direction, or of stator blade rows of the same type as member blade rows.

In further embodiments it is provided that, with at least one stage, the rotor assembly group is embodied with a single-row design and the stator assembly group is embodied with a blade row group, or that the rotor assembly group is embodied with a blade row group and the stator assembly group is embodied with a single-row design, or that the rotor assembly group is embodied with a blade row group and the stator assembly group is embodied with a blade row group. Here, a tandem arrangement with two rows of blades that are arranged at a fixed distance to each other is realized by the blade row group, for example.

An embodiment of the invention provides a design of the fluid flow machine in which the averaged blade profile angles $\beta_{RI}$, $\beta_{RE}$ of the rotor assembly group and the averaged blade profile angles $\beta_{SI}$, $\beta_{SE}$ of the stator assembly group are selected in such a manner that they lie within a value range to which applies: LC>0.2, in particular LC>0.35, in particular 0.35<LC<0.75, in particular 0.4<LC<0.6.

In a further embodiment of the invention it is provided that the following applies to the rotor coefficient RC of the rotor blade profiles and to the stator coefficient SC of the stator blade profiles:

$$SC > -6.4583 RC^2 + 2.225 RC + 0.2633,$$

Here, RC is the rotor coefficient and is calculated as $$RC = \Delta\alpha_R * \lambda_R, \text{ measured in rad}^2,$$

wherein $\Delta\alpha_R$ is the rotor deflection and $\lambda_R$ the rotor stagger angle, and wherein one has:

$$\Delta\alpha_R = \alpha_{RI} - \alpha_{RE}, \text{ measured in rad}$$

$$\lambda_R = (\alpha_{RI} + \alpha_{RE})/2, \text{ measured in rad}.$$

Further, SC is the stator coefficient and is calculated as $$SC = \Delta\alpha_S * \lambda_S, \text{ measured in rad}^2,$$

wherein $\Delta\alpha_S$ is the stator deflection and $\lambda_S$ is the stator stagger angle, and wherein one has:

$$\Delta\alpha_S = \alpha_{SI} - \alpha_{SE}, \text{ measured in rad, and}$$

$$\lambda_S = (\alpha_{SI} + \alpha_{SE})/2, \text{ measured in rad}.$$

What is thus regarded is the product of the deflection □□R, □□S of the blade profiles and the stagger angle □R, □S at the rotor and the stator, which is related with the above formula. Here, the rotor coefficient RC and the stator coefficient represent a loading value, wherein RC indicates the degree of deflection of the flow at the rotor assembly group and SC indicates the lift capacity of the stator assembly group. Here, high values of RC indicate a strong deflection of the flow at the rotor assembly group, and high values of SC a high lift capacity of the stator assembly group.

Here, it can be provided that, downstream of a stage with a high performance, a further such stage is provided in a directly adjacent manner, thus representing a multi-stage unit.

In one embodiment of the invention, a design of the fluid flow machine is provided in which the rotor deflection □□R and the rotor stagger angle □R are selected in such a manner that they lie within a value range to which applies: RC>0.2, in particular RC>0.3, in particular 0.3<RC<0.42, in particular 0.33<RC<0.39.

The solution according to the invention can be used in fluid flow machines having a stage that is formed by only one of rotor assembly group and stator assembly group as well as by multiple stages, respectively consisting of a rotor assembly group and a stator assembly group.

It is provided in one embodiment of the invention that the fluid flow machine according to the invention is a compressor of an aircraft engine, in particular of a turbofan engine.

BRIEF DESCRIPTION OF THE DRAWINGS

The invention will be explained in more detail on the basis of exemplary embodiments with reference to the accompanying drawings in which.

DETAILED DESCRIPTION

The present invention relates to a broad range of designs of a fluid flow machine (FFM).

The fluid flow machine consists of one or multiple stages. Every stage comprises a rotor assembly group (rotor, in short) and a stator assembly group (stator, in short). The rotor consists of a number of blades that are connected to a rotating shaft of the machine and supply energy to the working medium. The rotor can be embodied with or without a tip shroud at the exterior blade end. The stator consists of a number of stationary blades that can be embodied at the hub side as well as housing side with a fixated or free blade end. The rotor drum and the blading are surrounded by a housing. The machine can have a stator in front of the first rotor (inlet guide vane). In contrast to the immobile fixation, the stators can be mounted in a rotatable manner and can have a spindle that is accessible for the purpose of adjustment from outside the annular channel. Alternatively, the fluid flow machine can have a bypass flow configuration in such a manner that the single-flow annular channel is divided behind a certain blade row into two concentric annular channels, which in turn respectively comprise at least one further blade row. Further, if it has a multi-stage design, the mentioned fluid flow machine has two contra-rotating shafts, so that the rotor blade rows change the rotational direction from stage to stage. Here, there are no stators present between the contra-rotating rotors.

Figure 1:
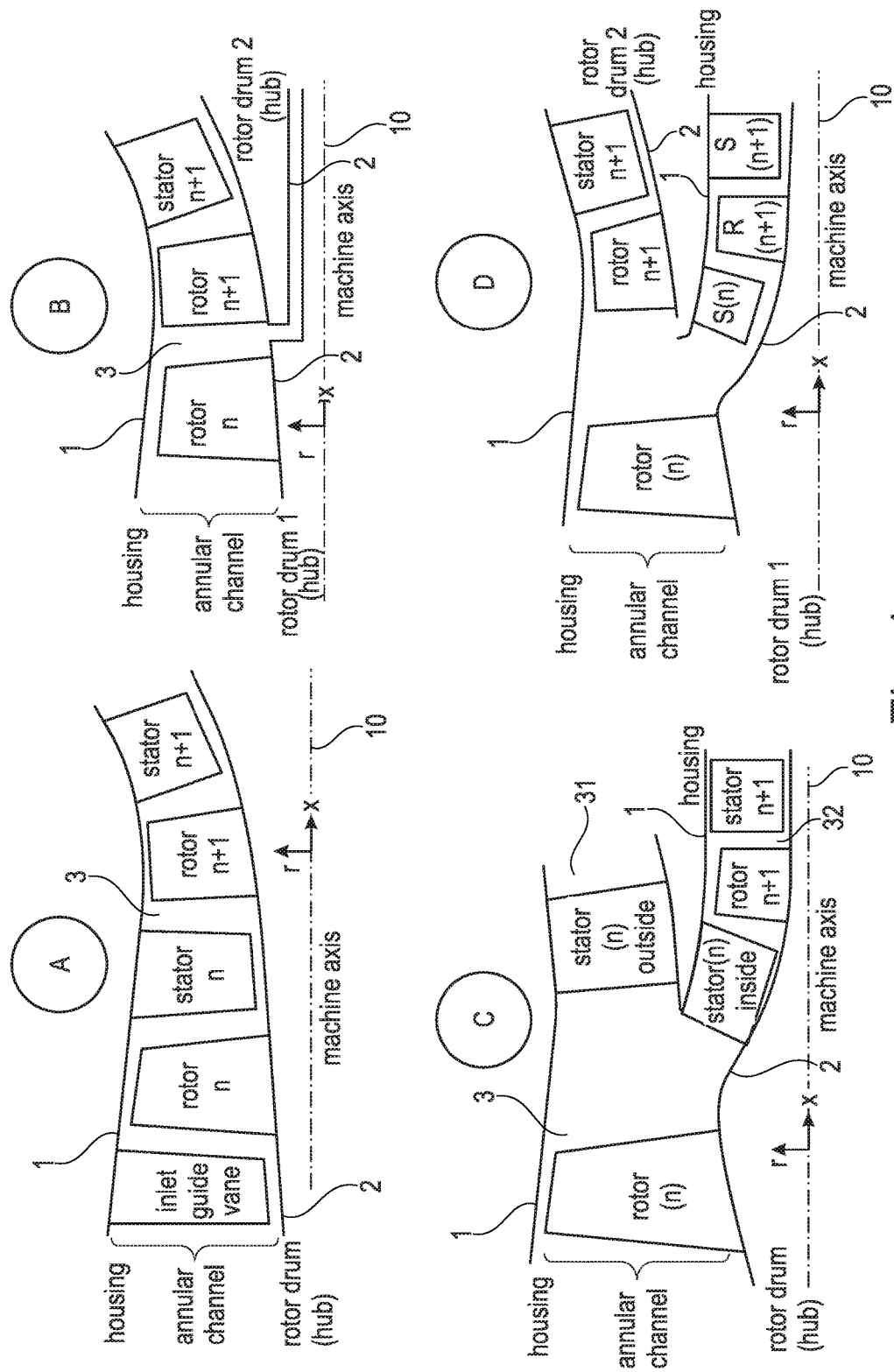
FIG. 1 shows schematically examples of fluid flow machines affected by the invention.

FIG. 1 shows, by way of example, four configurations A, B, C, D of a fluid flow machine that are possible according to the description. Here, the housing is respectively indicated by the reference sign 1, the rotor drum or the hub by the reference sign 2, the annular channel or main flow path by the reference sign 3, and the machine axis by the reference sign 10. Here, the configuration C corresponds to the configuration of a bypass aircraft engine. Behind the first rotor (fan), the annular channel 3 is divided into a secondary flow channel 31 and a primary flow channel 32, with the primary flow channel 32 leading through the core engine.

Figure 2:
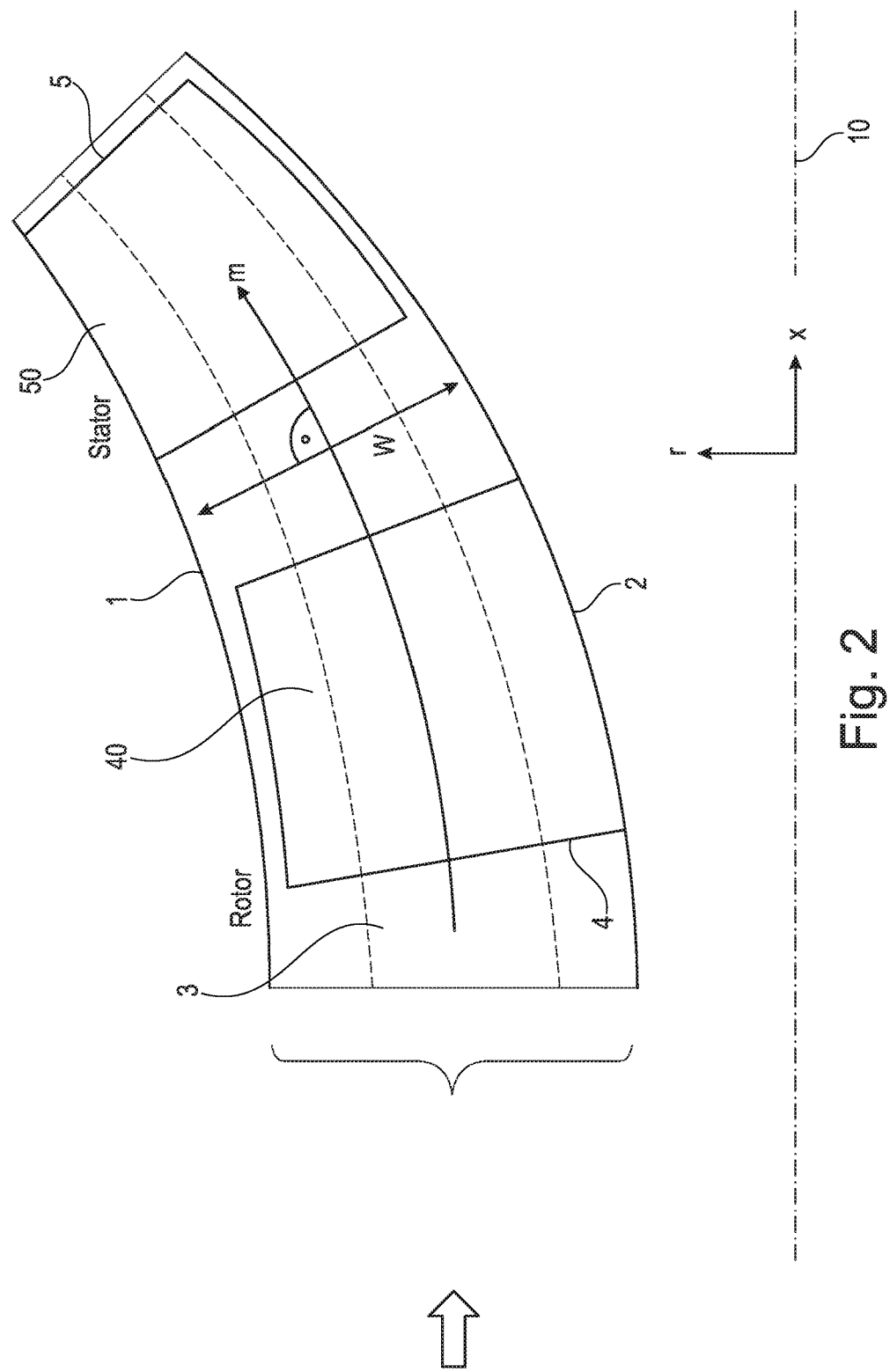
FIG. 2 shows the definition of meridian streamline profile sections.

FIG. 2 provides a precise definition of the meridian streamlines and the meridian streamline profile sections. What is shown is a section of a main flow path 3 that is delimitated radially outside by a housing 1 and radially inside by a rotor drum or hub 2. In the main flow path 3, a rotor blade 40 of a rotor assembly group 4 and a stator blade 50 of a stator assembly group 5 are shown in a schematic manner. The middle meridian streamline m is formed by the geometrical center of the annular channel 3. If a normal is set up at every location of the middle streamline m, what results is, for one thing, the course of the annular channel width W along the flow path and, for another thing, a number of normals, with the help of which further meridian streamlines are obtained at the same relative division in the direction of the channel height. The intersection of a meridian streamline with a blade 40, 50 results in a meridian streamline profile section, the intersection of the middle meridian streamline with a blade 40, 50 results in the so-called center cut.

In the solution according to the invention, it is advantageous if at least the stator assembly group of at least one stage of the fluid flow machine is embodied as a high-lift configuration. This is in particular advantageous if the individual stages of this fluid flow machine are provided with a course of the main flow path that allows for a comparatively strong area change across the rotor assembly group and a comparatively small area change across the stator assembly group, wherein the deflection of the rotor assembly group and its profile curvature, and in particular the product of deflection and stagger angle, is substantially larger than in the state of the art. Unlike in the state of the art, it is accordingly expedient to direct the design parameters that are significant in connection to this specification and in particular the blade profile angles of the rotor and stator, into a new area of the design space.

Figure 3:
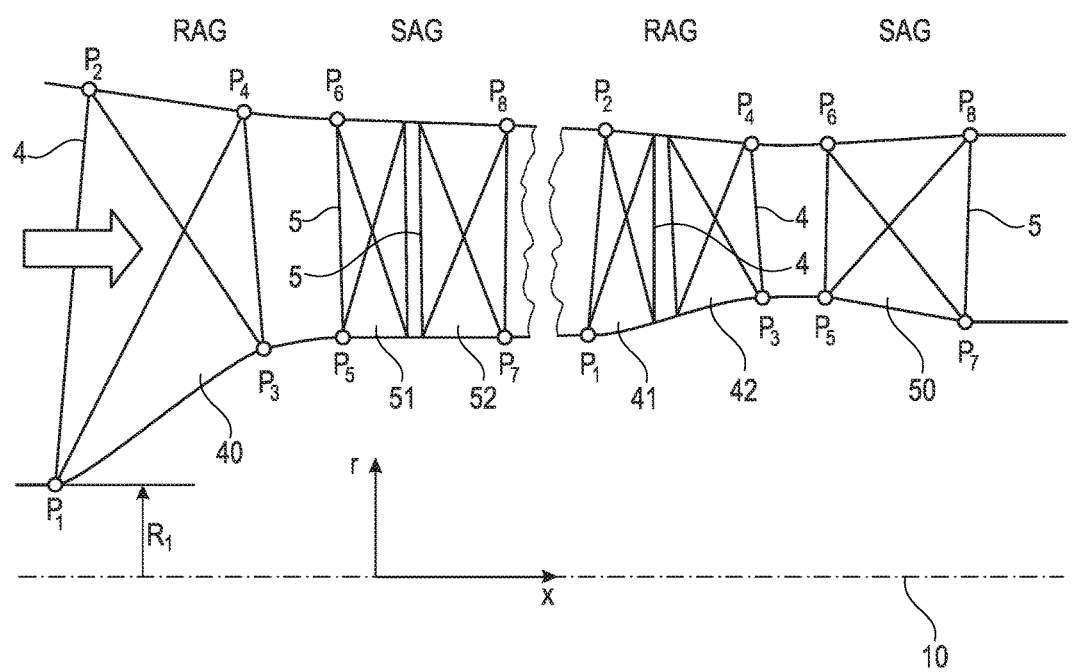
FIG. 3 shows, in a schematic manner, an exemplary embodiment of a fluid flow machine in the meridional section.

FIG. 3 shows two selected stages of a multi-stage fluid flow machine in axial design. The four corner points P1 to P4 of the rotor assembly group 4 (RAG) and the four corner points P5 to P8 of the stator assembly group 5 (SAG) are marked by dots. According to the invention, the rotor assembly group as well as the stator assembly group can have either a single blade row for meeting the aerodynamic tasks, or multiple (at least two) blade rows that are combined into a blade row group. By way of example, what is provided in the stage shown on the left are a rotor assembly group 4 with a blade row comprising blades 40 followed by a stator 5 with two member blade rows comprising blades 51, 52, and provided in the stage shown on the right are a rotor assembly group 4 with two member blade rows comprising blades 41, 42 followed by a stator assembly group 5 with a blade row comprising blades 50.

However, according to the invention also more than two member blade rows can be provided at the rotor assembly group 4 as well as at the stator assembly group 5. According to the invention, at least one stage of the fluid flow machine can comprise at least one blade row group, so that the following configurations according to the invention are possible:
1.) rotor assembly group with a single-row design, followed by a stator assembly group with a blade row group,
2.) rotor assembly group with a blade row group, followed by a stator assembly group with a single-row design,
3.) rotor assembly group with a blade row group, followed by a stator assembly group with a blade row group.

The corner points P1 to P8 are determined by the section points of the leading and trailing edges (or, in rotor or stator blade ends with a gap, their extension orthogonal to the edge of the main flow path edge) and the housing or the hub. If the hub or housing contour extends in the circumferential direction with a non-constant radius, the radius as arithmetically averaged in the circumferential direction comes into effect.

The rotor 4 has the points P1 to P4, the stator 5 has the points P5 to P8. Each point P(i) has the axial position X(i) and the radius R(i), as it is for example drawn in for the point P1. The reference coordinate system is positioned on the machine axis 10.

The machine is passed by the flow always from left to right, as shown by the thick arrow.

At that, in the through-flow direction of the fluid flow machine, it applies that $R_1$ is the radius at the radially innermost point $P_1$ of the leading edge of that blade row of the rotor assembly group that is located furthest upstream, $R_2$ is the radius at the radially outermost point $P_2$ of the leading edge of that blade row of the rotor assembly group that is located furthest upstream, $R_3$ is the radius at the radially innermost point $P_3$ of the trailing edge of that blade row of the rotor assembly group that is located furthest downstream, $R_4$ is the radius at the radially outermost point $P_4$ of the trailing edge of that blade row of the rotor assembly group that is located furthest downstream, $R_5$ is the radius at the radially innermost point $P_5$ of the leading edge of that blade row of the stator assembly group that is located furthest upstream, $R_6$ is the radius at the radially outermost point $P_6$ of the leading edge of that blade row of the stator assembly group that is located furthest upstream, $R_7$ is the radius at the radially innermost point $P_7$ of the trailing edge of that blade row of the stator assembly group that is located furthest downstream.

Figure 4:
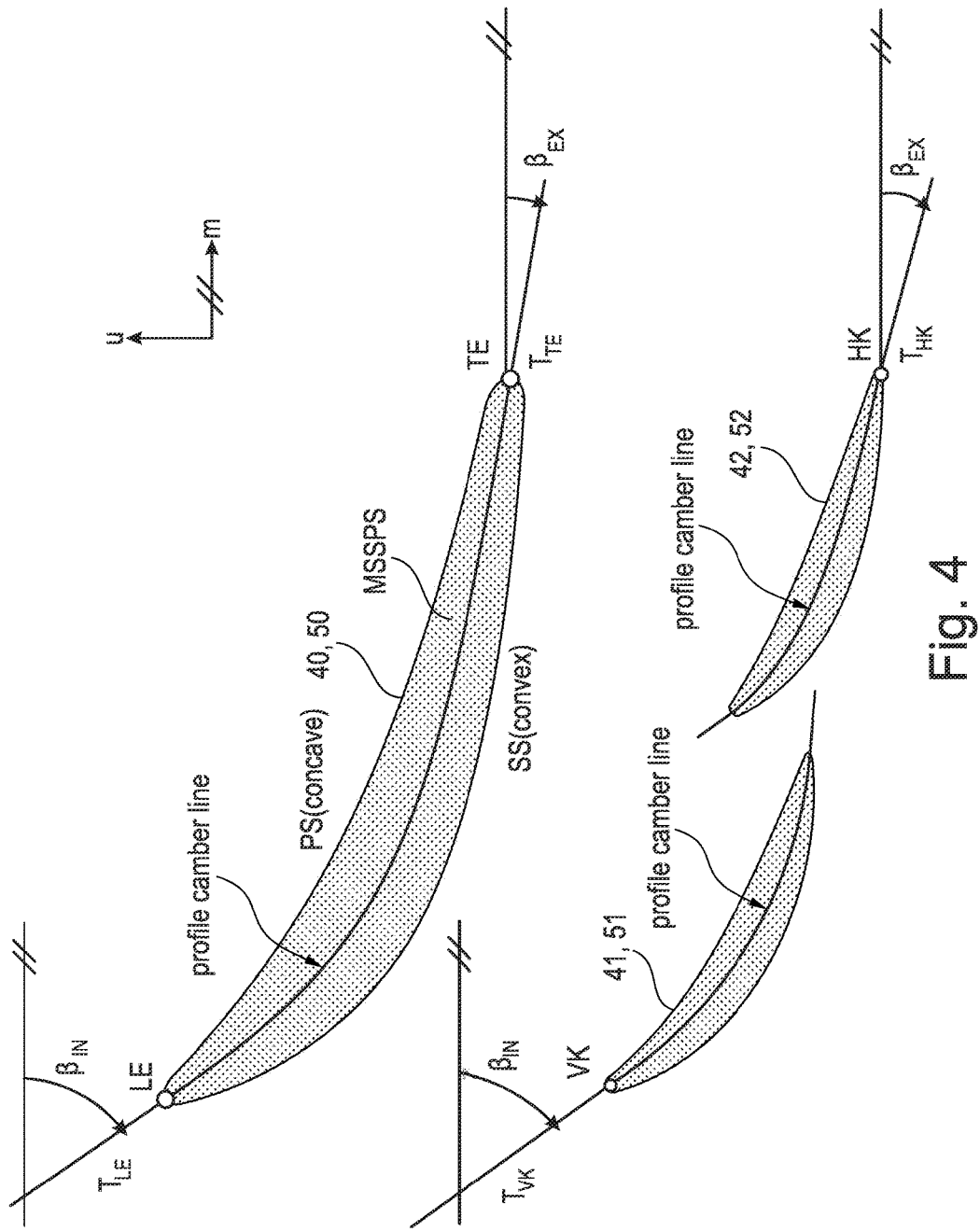
FIG. 4 shows the definition of the blade profile angle at the leading and trailing edge of a meridian streamline profile section (MSPS) of a rotor assembly group (R) or stator assembly group (S) or inlet guide stator assembly group (I)

$R_8$ is the radius at the radially outermost point $P_8$ of the trailing edge of that blade row of the stator assembly group that is located furthest downstream FIG. 4 shows, in a schematic manner, the definition of the blade profile angle, also referred to as the metal angle, at the leading and trailing edge of a blade profile. What is shown in the top part of the image is a meridian streamline profile section of a blade on a meridian flow area (u-m plane). It can be a rotor blade 40, a stator blade 50, or an inlet guide stator blade, with the definition system being identical for all of them.

In order to determine the metal angles, it is necessary to determine the profile camber line in the plane of the blade profile section, that means the center line between the pressure side (DS) and the suction side (SS) of the profile. The tangents TLE and TTE that are applied to the profile camber line at the leading and the trailing edge point (LE, TE) quantify the orientation of the profile and thus the metal angle. Finally, the entry metal angle □IN results between the tangent TLE and the meridian direction m, the exit metal angle □EX results between the tangent TTE and the meridian direction m.

What is shown in the lower part of the image is the meridian streamline section through a blade row group, consisting of at least two member blade rows comprising blades 41, 51, 42, 52 and being arranged in succession behind each other in flow direction. They may be member blade rows of a rotor assembly group, a stator assembly group, or an inlet guide stator assembly group, with the definition system again being identical for all of them.

What results in this case is an entry metal angle □IN at the leading edge LE of the member blade row arranged furthest upstream, between the tangent TLE at its camber line and the meridian direction m, and the exit metal angle □EX results at the trailing edge TE of the member blade row arranged the furthest downstream, between the tangent TTE at its camber line and the meridian direction m.

Figure 5:
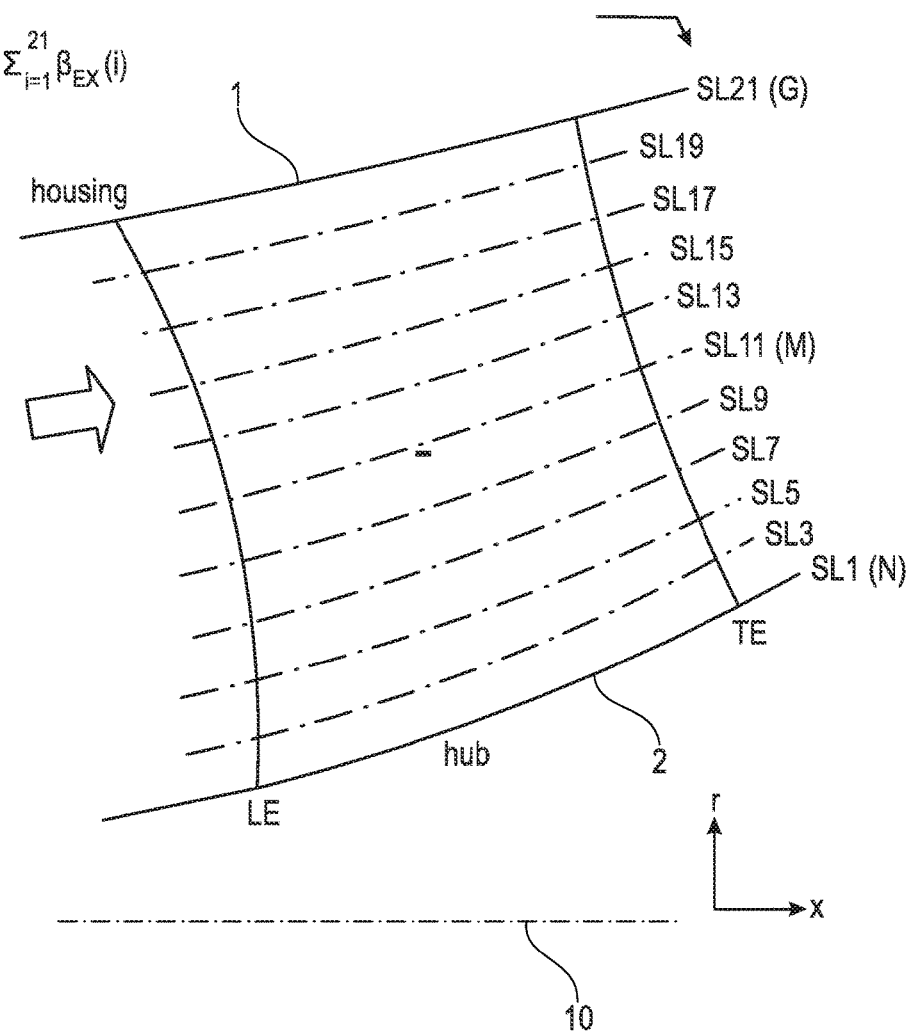
FIG. 5 shows the determination of mean values of the blade profile angles across the blade height based on 21 meridian streamline profile sections.

If the local blade profile angles are known, the mean value can be formed as a representative value for a rotor assembly group (R), the stator assembly group (S), or the inlet guide stator assembly group (I) across a number of e.g. 21 meridian streamline profile sections that are distributed in an equidistant manner along the main flow path height between the hub and the housing contour, see FIG. 5 in which the 21 equidistant meridian streamline profile sections according to FIGS. 2 and 4 are regarded (which only every other meridian streamline being drawn in):

According to this system, the blade profile angles (metal angles) of the rotor assembly group (R) or the stator assembly group (S) or of an inlet guide stator assembly group (I), which are averaged over the blade height, are obtained based on the formula:

$$\beta_I = \Sigma_{i=1\ldots 21} \beta_{IN}(i)/21$$

$$\beta_E = \Sigma_{i=1\ldots 21} \beta_{EX}(i)/21,$$

wherein $\beta_I$ indicates the averaged entry blade profile angle and $\beta_E$ the averaged exit blade profile angle.

Specifically, resulting as averaged blade profile angles $\beta_{RI}$, $\beta_{RE}$ of the rotor assembly group (R), as averaged blade profile angles $\beta_{SI}$, $\beta_{SE}$ of the stator assembly group (S), and as averaged exit blade profile angles $\beta_{IE}$ of a possibly present inlet guide stator assembly group (I) are the following:

$$\beta_{IE} = [\Sigma_{i=1\ldots 21} \beta_{IEX}(i)]/21$$

$$\beta_{RI} = [\Sigma_{i=1\ldots 21} \beta_{RIN}(i)]/21$$

$$\beta_{RE} = [\Sigma_{i=1\ldots 21} \beta_{REX}(i)]/21$$

$$\beta_{SI} = [\Sigma_{i=1\ldots 21} \beta_{SIN}(i)]/21$$

$$\beta_{SE} = [\Sigma_{i=1\ldots 21} \beta_{SEX}(i)]/21$$

Consequently, the flow-relevant effective angles at the entry and the exit of the inlet guide stator assembly group (I), the rotor assembly group (R) and the stator assembly group (S) of a stage of the fluid flow machine are:

Effective Inlet Guide Stator Exit Angle:

$$\alpha_{IE} = [\Sigma_{i=1\ldots 21} \beta_{IEX}(i)]/21 + [2/180*\pi] = \beta_{IE} + [2/180*\pi],$$
if the inlet guide stator assembly group effects a deflection of the flow towards the machine axis direction, $$\alpha_{IE} = [\Sigma_{i=1\ldots 21} \beta_{IEX}(i)]/21 - [2/180*\pi] = \beta_{IE} - [2/180*\pi],$$
if the inlet guide stator assembly group effects a deflection of the flow away from the machine axis direction.

Effective Rotor Entry Angle:

$$\alpha_{RI} = [\Sigma_{i=1\ldots 21} \beta_{RIN}(i)]/21 - [2/180*\pi] = \beta_{RI} - [2/180*\pi]$$

Effective Rotor Exit Angle:

$$\alpha_{RE} = [\Sigma_{i=1\ldots 21} \beta_{REX}(i)]/21 + [2/180*\pi] = \beta_{RE} + [2/180*\pi]$$

Effective Stator Entry Angle:

$$\alpha_{SI} = [\Sigma_{i=1\ldots 21} \beta_{SIN}(i)]/21 - [2/180*\pi] = \beta_{SI} - [2/180*\pi]$$

Effective Stator Exit Angle:

$$\alpha_{SE} = [\Sigma_{i=1\ldots 21} \beta_{SEX}(i)]/21 + [2/180*\pi] = \beta_{SE} + [2/180*\pi]$$

Here, the angle $-[2/180*\pi]$ is an incidence angle, and the angle $+[2/180*\pi]$ is a deviation angle. The incidence angle is the angle between the entry flow direction and the tangents TLE applied to the profile camber line at the leading edge point (LE); the deviation angle is the angle between the exit flow direction and the tangents TTE, applied to the profile camber line at the trailing edge point (TE), cf. FIG. 3. With these angles, that it is taken into account that the flow is flowing to the blades or away from them at a smaller angle with respect to the entry blade profile angle $\beta_{IN}$ and the exit blade profile angle EX, wherein, with a normal design, this angle is assumed to be $2\pi/180*$ at approximately $\pm 2$ degrees.

In the case that a stage (consisting of the rotor assembly group and the rotor assembly group that is arranged directly downstream of the stator assembly group) has no inlet guide stator assembly group, the value zero it to be assumed for the effective inlet guide stator exit angle IE if a swirl-free inflow to the rotor assembly group is provided, and the averaged angle value of the inflow swirl in front of the rotor assembly group is to be assumed if a swirling inflow is present due to other built-in components.

Based on the provided values, multiple relevant key figures for the design of a fluid flow machine can be determined, with the help of which the aerodynamic quality, the power density and the shape of the main flow path—and thus ultimately the degree of performance in a fluid flow machine—can be obtained. The following definitions apply:

load count of the stage:

$$LC = [1/(\tan \alpha_{RE} + \tan \alpha_{SI})*(\tan \alpha_{SI})] - [1/(\tan \alpha_{RI} + \tan \alpha_{IE})*(\tan \alpha_{IE})]$$

Rotor Stagger Count:

$$RSC = 1/(\tan \alpha_{RI} + \tan \alpha_{IE})$$

area change count of a stage (consisting of a rotor assembly group and stator assembly group):

$$ACC = [(R_2^2 - R_1^2)/(R_4^2 - R_3^2)]/[(R_6^2 - R_5^2)/(R_8^2 - R_7^2)]$$

Figure 6:
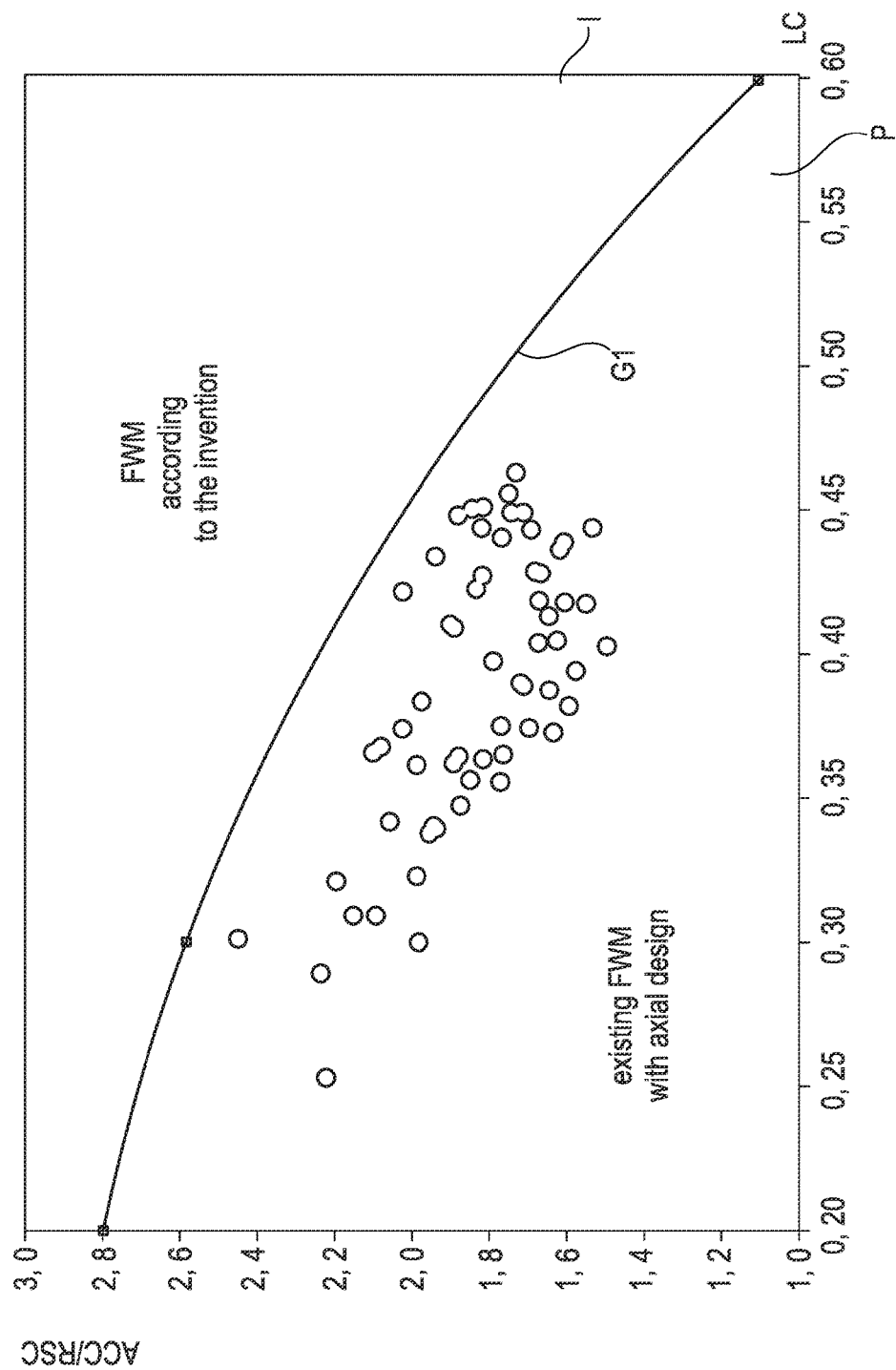
FIG. 6 shows the boundary line for the relationship between load count, rotor stagger count and area change count, according to the invention.

These three important characteristics of a fluid flow machine are regarded in FIG. 6. Therein, the quotient ACC/RSC of area change count ACC and rotor stagger count RSC is shown as a function of the load count LC.

The diagram shows a comprehensive grouping of value points P that have been determined for an existing fluid flow machine according to the state of the art. Understandably, they are located within a narrow belt resulting from the observance of the usual design rules for blades and main gas paths.

However, if the possibilities resulting from the use of high-lift configurations are realized at least in the area of the stator assembly group and a new design space for advantageous combinations of LC, ACC and RSC is opened up, the solutions I for a fluid flow machine according to the invention are located in the upper right value range as highlighted in the diagram.

The solutions according to the current state can be clearly demarcated by an enveloping line. This line is drawn in as a "boundary line" G1 in FIG. 6 and is defined by the connections as expressed in the following formula:

$$ACC/RSC = -7.2143 LC^2 + 1.5414 LC + 2.776$$

Value points I for stages of a fluid flow machine according to the invention lie above this boundary line G1, i.e. the following applies to the stages of a fluid flow machine according to the invention: $ACC/RSC > -7.2143 LC^2 + 1.5414 LC + 2.776$.

What results for a desired value point I, which lies above the boundary line G1 and which is to be realized in a stage, are groupings of values for the averaged blade profile angles $\beta RI$, $\beta RE$ of the rotor assembly group, the averaged blade profile angles $\beta SI$, $\beta SE$ of the stator assembly group, as well as the course of the cross-sectional areas of the main flow path in the downstream direction as determined by the radiuses R1 to R8. In this manner, suitable values of $\beta RI$, $\beta RE$, $\beta SI$, $\beta SE$ as well as R1 to R8 can be determined, with the values satisfying the mentioned formulas regarding ACC, RSC, LC.

According to the invention, a design in the value range of LC>0.2 has an advantageous effect. According to the invention, a design in the value range of LC>0.35 has a favorable effect. According to the invention, a design in the value range of 0.35<LC<0.75 has a very favorable effect. According to the invention, a design in the value range of 0.4<LC<0.6 has a particularly favorable effect.

A special feature of the fluid flow machine according to the invention is that the deflection of the rotor blade profiles is larger than usual, and in particular the product of the deflection of the rotor blade profiles and the stagger angles of the rotor blade profiles is considerably larger than in the state of the art. The following definitions apply:

rotor deflection: $\Delta\alpha_R=\alpha_{RI}-\alpha_{RE}$, measured in rad rotor stagger angle: $\lambda_R=(\alpha_{RI}+\alpha_{RE})/2$, measured in rad rotor coefficient: $RC=\Delta\alpha_R*\lambda_R$, measured in $rad^2$ stator deflection: $\Delta\alpha_S=\alpha_{SI}-\alpha_{SE}$, measured in rad stator stagger angle: $\lambda_S=(\alpha_{SI}+\alpha_{SE})/2$, measured in rad stator coefficient: $SC=\Delta\alpha_S*\lambda_S$, measured in $rad^2$ The product of the deflection of the stator blade profiles and the stagger angles of the stator blade profiles lies closer to the range of the state of the art.

Figure 7:
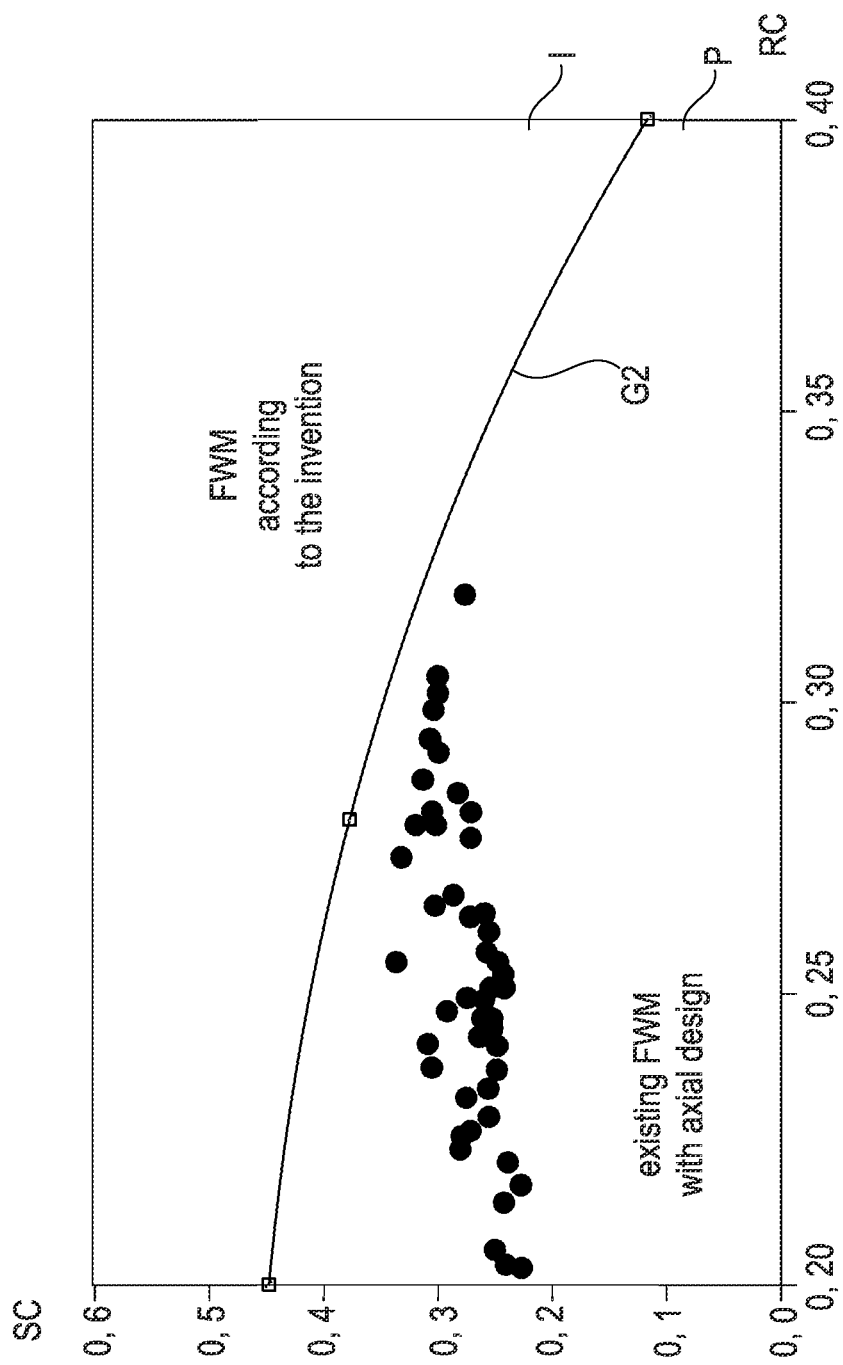
FIG. 7 shows the boundary line for the relationship between the rotor coefficient and the stator coefficient, according to the invention.

When regarding the new design space for advantageous combinations of RC and SC, the solutions for a fluid flow machine according to the invention lie in the right-hand heightened value range as highlighted in the diagram of FIG. 7.

The solutions P according to the current standard can be clearly demarcated by an enveloping line. This line is drawn in as a "boundary line" G2 in FIG. 7 and is defined by the connections as expressed in the following formula:

$$SC=-6.4583RC^2+2.225RC+0.2633$$

Value points I for stages of a fluid flow machine according to the invention lie above this boundary line G2. i.e. according to the invention one has:

$$SC>-6.4583RC^2+2.225RC+0.2633.$$

According to the invention, a design in the value range of RC>0.2 has an advantageous effect. According to the invention, a design in the value range of RC>0.3 has a favorable effect. According to the invention, a design in the value range of 0.3<RC<0.42 has a very favorable effect. According to the invention, a design in the value range of 0.33<RC<0.39 has a particularly favorable effect.

It is particularly advantageous according to the invention if it can be provided that, downstream of a stage with a high degree of performance according to the invention, a further such stage is provided in a directly adjacent manner, thus representing a multi-stage unit.

Compared to the state of the art, the solution according to the invention is very advantageous in particular in the case that different design methods are used for rotors and stators. According to the invention, the use of a high degree of performance of the stage and a geometry of the blades and of the main flow path that are correspondingly combined in an optimized manner provide the precondition for creating a new design space for fluid flow machines, possibilities for an effective hybrid application in the evolutionarily developing modern blade technology and novel high-lift blade concept (e.g. blade row group).

The solution approach according to the invention is thus entirely novel and different from what is known in the state of the art, creating a distinctive category of new fluid flow machines.

It is furthermore pointed out that the features of the individually described exemplary embodiments of the invention can be combined in various combinations with one another. Where areas are defined, they include all the values within these areas and all the sub-areas falling within an area.

What is claimed is:

1. A fluid flow machine, comprising:
a main flow path that is formed by a hub and a housing,
at least one arrangement of rotating blades arranged in the main flow path that supply energy to a working fluid and form a rotor assembly group,
at least one arrangement of resting blades arranged in the main flow path adjacent to the rotor assembly group that form a stator assembly group, wherein
respectively one rotor assembly group and one stator assembly group adjacent thereto form a stage of the fluid flow machine, and
cross-sectional areas of the main flow path are submitted to a change in a downstream direction in at least one stage of the fluid flow machine, wherein
in at least one stage, averaged blade profile angles $\beta_{RI}$, $\beta_{RE}$ of the rotor assembly group, averaged blade profile angles $\beta_{SI}$, $\beta_{SE}$ of the stator assembly group, as well as a course of the cross-sectional areas of the main flow path in the downstream direction are selected such that they satisfy the following relationship:

$$ACC/RSC>-7.2143LC^2+1.5414LC+2.776,$$

wherein ACC indicates an area change count of a stage and is defined based on the following formula:

$$ACC=[(R_2^2-R_1^2)/(R_4^2-R_3^2)]/[(R_6^2-R_5^2)/(R_8^2-R_7^2)],$$

wherein, in a through-flow direction of the fluid flow machine, it applies that
$R_1$ is a radius at a radially innermost point of a leading edge of a blade row of the rotor assembly group that is located furthest upstream,
$R_2$ is a radius at a radially outermost point of the leading edge of the blade row of the rotor assembly group that is located furthest upstream,
$R_3$ is a radius at a radially innermost point of a trailing edge of a blade row of the rotor assembly group that is located furthest downstream,
$R_4$ is a radius at a radially outermost point of the trailing edge of the blade row of the rotor assembly group that is located furthest downstream,
$R_5$ is a radius at a radially innermost point of a leading edge of a blade row of the stator assembly group that is located furthest upstream,
$R_6$ is a radius at a radially outermost point of the leading edge of the blade row of the stator assembly group that is located furthest upstream,
$R_7$ is a radius at a radially innermost point of a trailing edge of a blade row of the stator assembly group that is located furthest downstream,
$R_8$ is a radius at a radially outermost point of the trailing edge of the blade row of the stator assembly group that is located furthest downstream,
wherein RSC indicates a rotor stagger count of a stage and is defined based on the following formula:

$$RSC=1/(\tan\alpha_{RI}+\tan\alpha_{IE}),$$

wherein LC defines a load count of a stage and is defined based on the following formula:

$$LC=[1/(\tan\alpha_{RE}+\tan\alpha_{SI})*(\tan\alpha_{SI})]-[1/(\tan\alpha_{RI}+\tan\alpha_{IE})*(\tan\alpha_{IE})]),$$

wherein $\alpha_{IE}$ is an averaged angle value of an inflow swirl in front of the rotor assembly group, wherein $\alpha_{RI}$ is an effective rotor entry angle and is defined as:

$$\alpha_{RI} = \beta_{RI} - [2/180*\pi],$$

wherein $\beta_{RE}$ is an effective rotor exit angle and is defined as:

$$\beta_{RE} = \beta_{RE} + [2/180*\pi],$$

wherein $\alpha SI$ is an effective stator entry angle and is defined as:

$$\alpha_{SI} = \beta_{SI} - [2/180*\pi],$$

wherein $\alpha_{SE}$ is an effective stator exit angle and is defined as:

$$\alpha_{SE} = \beta_{SE} + [2/180*\pi],$$

wherein $\beta_{RI}$ indicates an averaged entry blade profile angle of the rotor assembly group,
wherein $\beta_{RE}$ indicates an averaged exit blade profile angle of the rotor assembly group,
wherein $\beta_{SI}$ indicates an averaged entry blade profile angle of the stator assembly group, and
wherein $\beta_{SE}$ indicates the averaged exit blade profile angle of the stator assembly group.

2. The fluid flow machine according to claim 1, wherein the averaged entry blade profile angle $\beta_{RI}$ of the rotor assembly group, the averaged exit blade profile angle $\beta_{RE}$ of the rotor assembly group, the averaged entry blade profile angle $\beta_{SI}$ of the stator assembly group, and the averaged exit blade profile angle $\beta_{SE}$ of the stator assembly group are determined as follows:

$$\beta_{RI} = [\Sigma_{i=1\ldots 21}\beta_{RIN}(i)]/21$$

$$\beta_{RE} = [\Sigma_{i=1\ldots 21}\beta_{REX}(i)]/21$$

$$\beta_{SI} = [\Sigma_{i=1\ldots 21}\beta_{SIN}(i)]/21$$

$$\beta_{SE} = [\Sigma_{i=1\ldots 21}\beta_{SEX}(i)]/21$$

wherein $\beta_{RIN}(i)$ indicates an entry blade profile angle of the rotor assembly group in a meridian streamline profile section (i),
wherein $\beta_{REX}(i)$ indicates an exit blade profile angle of the rotor assembly group in the meridian streamline profile section (i),
wherein $\beta_{SIN}(i)$ indicates an entry blade profile angle of the stator assembly group in the meridian streamline profile section (i), and
wherein $\beta_{SEX}(i)$ indicates an exit blade profile angle of the stator assembly group in the meridian streamline profile section (i), and
wherein the meridian streamline profile sections (i) are distributed in an equidistant manner between the hub and housing.

3. The fluid flow machine according to claim 1, wherein the fluid flow machine has an inlet guide stator assembly group that is arranged upstream with respect to the regarded stage, for which case the averaged angle value $\alpha_{IE}$ of the inflow swirl in front of the rotor assembly group is determined by an effective inlet guide stator exit angle of the inlet guide stator assembly group, wherein one has:

$$\alpha_{IE} = [\Sigma_{i=1\ldots 21}\beta_{IEX}(i)]/21 + [2/180*\pi] = \beta_{IE} + [2/180*\pi],$$

if the inlet guide stator assembly group effects a deflection of the flow towards the machine axis direction, $$\alpha_{IE} = [\Sigma_{i=1\ldots 21}\beta_{IEX}(i)]/21 - [2/180*\pi] = \beta_{IE} - [2/180*\pi],$$

if the inlet guide stator assembly group effects a deflection of the flow away from the machine axis direction, wherein $\beta_{IE}$ indicates an averaged exit blade profile angle of the inlet guide stator assembly group.

4. The fluid flow machine according to claim 1, wherein the stator assembly group of at least one stage is formed by a high-lift configuration.

5. The fluid flow machine according to claim 1, wherein at least one of the stages of the fluid flow machine includes a course of the main flow path, in which a stronger area change is realized across the rotor assembly group and, as compared therewith, a smaller area change is realized across the stator assembly group.

6. The fluid flow machine according to claim 1, wherein at least one chosen from the rotor assembly group and the stator assembly group of at least one stage is formed by a blade row group, wherein the blade row group consists of multiple rotor blade rows that are arranged adjacent to each other in the main flow direction or of stator blade rows of the same type as member blade rows.

7. The fluid flow machine according to claim 1, wherein a respective blade profile angle ($\beta_{IN}$, $\beta_{EX}$) is defined as an angle in a meridian streamline profile section between a tangent ($T_{VR}$, $T_{TE}$) applied to a profile camber line at a leading edge point or at a trailing edge point and a meridian direction.

8. The fluid flow machine according to claim 1, wherein, with at least one stage, the rotor assembly group is a single-row configuration and the stator assembly group includes a blade row group.

9. The fluid flow machine according to claim 1, wherein, with at least one stage, the rotor assembly group includes a blade row group and the stator assembly group is a single-row configuration.

10. The fluid flow machine according to claim 1, wherein, with at least one stage, the rotor assembly group includes a blade row group and the stator assembly group is embodied with a blade row group.

11. The fluid flow machine according to claim 2, wherein the averaged blade profile angles $\beta_{RI}$, $\beta_{RE}$ of the rotor assembly group and the averaged blade profile angles $\beta_{SI}$, $\beta_{SE}$ of the stator assembly group are selected in such a manner that they lie within a value range to which the following applies: $LC > 0.35$.

12. The fluid flow machine according to claim 1, wherein the following applies to a rotor coefficient RC of the rotor blade profiles and a stator coefficient SC of the stator blade profiles:

$$SC = -6.4583 RC^2 + 2.225 RC + 0.2633,$$

wherein the rotor coefficient RC is calculated as $$RC = \Delta\alpha_R * \lambda_R, \text{ measured in rad}^2,$$

wherein $\Delta\alpha_R$ is a rotor deflection and $\lambda_R$ is a rotor stagger angle, and wherein it applies that:

$$\Delta\alpha_R = \alpha_{RI} - \beta_{RE}, \text{ measured in rad},$$

$$\lambda_R = (\alpha_{RI} + \alpha_{RE})/2, \text{ measured in rad},$$

and wherein the stator coefficient SC is calculated as $$SC = \Delta\alpha_S * \lambda_S, \text{ measured in rad}^2,$$

wherein $\Delta\alpha_S$ is a stator deflection and $\lambda_S$ is a stator stagger angle, and wherein it applies that:

$$\Delta\alpha_S = \alpha_{SI} - \alpha_{SE}, \text{ measured in rad, and}$$

$$\lambda_S = (\alpha_{SI} + \alpha_{SE})/2, \text{ measured in rad}.$$

13. The fluid flow machine according to claim 12, wherein the rotor deflection $\Delta\alpha_R$ and the rotor stagger angle $\lambda_R$ are selected in such a manner that they lie within a value range to which the following applies: $RC > 0.2$.

14. The fluid flow machine according to claim 1, wherein downstream of a stage with a high performance, a further such stage is provided in a directly adjacent manner, thus representing a multi-stage unit.

\* \* \* \* \*